(12) United States Patent
Shindo et al.

(10) Patent No.: US 7,146,507 B2
(45) Date of Patent: Dec. 5, 2006

(54) INFORMATION RECORDING APPARATUS HAVING FUNCTION OF ENCRYPTING INFORMATION

(75) Inventors: Tomoyuki Shindo, Yamato (JP); Takeo Ohishi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 982 days.

(21) Appl. No.: 10/196,152

(22) Filed: Jul. 17, 2002

(65) Prior Publication Data
US 2003/0065925 A1    Apr. 3, 2003

(30) Foreign Application Priority Data
Oct. 3, 2001   (JP) ............................ 2001-307160

(51) Int. Cl.
G06F 11/30 (2006.01)
G06F 12/14 (2006.01)
H06F 9/32 (2006.01)
H04N 7/167 (2006.01)

(52) U.S. Cl. ...................................... 713/189; 380/201
(58) Field of Classification Search ................ 713/189; 380/201
See application file for complete search history.

(56) References Cited

U.S. PATENT DOCUMENTS 5,805,700 A * 9/1998 Nardone et al. ............ 380/217

FOREIGN PATENT DOCUMENTS

| JP | 11-195269 | 7/1999 |
|----|-----------|--------|
| JP | 11-509397 | 8/1999 |
| JP | 2001-184787 | 7/2001 |
| JP | 2003-110546 | 4/2003 |
| WO | WO97/14147 | 4/1997 |

OTHER PUBLICATIONS

"Chapter 6 Content Channel Management and Protection": Digital Transmission Content Protection Specification Revision 1.2 (Informational Version): Jul. 11, 2001: pp. 35-47.

* cited by examiner

Primary Examiner—Jacques Louis-Jacques
Assistant Examiner—Peter Poltorak
(74) Attorney, Agent, or Firm—Louis Woo (57) ABSTRACT

First information is divided into equal-size information pieces. Serial numbers are assigned to the information pieces, respectively. An encryption key is generated from a base number and a variable number varying for each of the information pieces. The base number is common to an information range managed by one licence. The first information is encrypted on a block-by-block basis in response to the encryption key to get encryption-resultant information for every predetermined minimum information unit smaller than the sizes of the information pieces. The encryption-resultant information is recorded on a recording medium. A determination is made as to logical addresses of heads of portions of the recording medium which are loaded with portions of the encryption-resultant information corresponding to the respective information pieces. Second information representing a correspondence relation between the determined logical addresses and the assigned serial numbers is recorded on the recording medium.

22 Claims, 4 Drawing Sheets

INFORMATION RECORDING APPARATUS HAVING FUNCTION OF ENCRYPTING INFORMATION

BACKGROUND OF THE INVENTION

1. Field of the Invention

This invention relates to an apparatus for recording information which has a function of encrypting the information. In addition, this invention relates to a method of recording information which has a step of encrypting the information. Furthermore, this invention relates to an apparatus for recording and reproducing information which has a function of encrypting the information and a function of decrypting the encryption-resultant information. Also, this invention relates to a method of recording and reproducing information which has a step of encrypting the information and a step of decrypting the encryption-resultant information. In addition, this invention relates to a recording medium.

2. Description of the Related Art

In a common-key cryptosystem (a secret-key cryptosystem), a key for encrypting original data and a key for decrypting the encryption-resultant data are the same. Thus, a common key is used for encrypting original data and also decrypting the encryption-resultant data. Generally, the common key is secret.

It is known that original audio-visual data representing one movie content are encrypted in response to only one common key. In the event that the common key is disclosed, the original data can be reproduced from the encryption-resultant data by use of the disclosed key so that the whole of the movie content can be illegally played back.

A first conceivable system implements encryption on a block-by-block basis. Specifically, original audio-visual data are divided into successive equal-size blocks. The data blocks are encrypted in response to different keys, respectively. A legitimate encryption side and a legitimate decryption side hold signals representing the keys. In the event that one of the keys is disclosed, only a portion (a block) of the original audio-visual data which has been encrypted by use of the disclosed key can be illegally recovered.

A second conceivable system improves over the first conceivable system. In the second conceivable system, signals representative of keys for encrypting data blocks are also encrypted. The encryption-resultant key-representing signals are stored.

A third conceivable system improves over the first conceivable system. The third conceivable system uses an initial key in encrypting a first data block. Second and later keys are generated from the initial key according to prescribed rules. Second and later data blocks are encrypted in response to the second and later keys. It is unnecessary for a legitimate encryption side and a legitimate decryption side to hold signals representing the second and later keys.

A fourth conceivable system divides original audio-visual data into successive equal-size blocks. The fourth conceivable system uses a seed of keys. For every audio-visual content, a signal representing the seed is encrypted by a public-key cryptosystem. Keys are calculated from the seed-representing signal according to a secret function. The data blocks are encrypted in response to the calculated keys, respectively. The calculated keys are separated into a group of odd keys and a group of even keys. The odd keys and the even keys are alternately used. A key change timing is controlled by 1-bit information indicating which of an odd key and an even key should be used.

A fifth conceivable system is modified from the fourth conceivable system. The fifth conceivable system uses an initial value protected by a public-key cryptosystem. Firstly, a parameter value is set to the initial value. Thereafter, the parameter value is counted up or incremented each time change between an odd key and an even key occurs. The parameter value is processed by a one-way function. A portion of the processing-resultant value is used as a key for encrypting a data block.

It is assumed that encryption-resultant data blocks generated by one of the third, fourth, and fifth conceivable systems are recorded on a recording medium. During high-speed playback, some of the encryption-resultant data blocks are reproduced from the recording medium while others are skipped. In this case, to determine keys for the reproduced encryption-resultant data blocks, it is necessary to detect the conditions of skipping data blocks in the recording medium. Therefore, the determination of the keys is troublesome.

SUMMARY OF THE INVENTION

It is a first object of this invention to provide an improved apparatus for recording information which has a function of encrypting the information.

It is a second object of this invention to provide an improved method of recording information which has a step of encrypting the information.

It is a third object of this invention to provide an improved apparatus for recording and reproducing information which has a function of encrypting the information and a function of decrypting the encryption-resultant information.

It is a fourth object of this invention to provide an improved method of recording and reproducing information which has a step of encrypting the information and a step of decrypting the encryption-resultant information.

It is a fifth aspect of this invention to provide an improved recording medium.

A first aspect of this invention provides an information recording apparatus comprising first means for dividing first information to be recorded into equal-size information pieces; second means for assigning serial numbers to the information pieces respectively which are generated by the first means; third means for generating a secret function from a base number and a variable number varying for each of the information pieces, the base number being common to an information range managed by one licence; fourth means for generating an encryption key according to the secret function generated by the third means, the encryption key being updated for each of the information pieces; fifth means for encrypting the first information on a block-by-block basis in response to the encryption key generated by the fourth means to get encryption-resultant information for every predetermined minimum information unit smaller than the sizes of the information pieces; sixth means for recording the encryption-resultant information generated by the fifth means on a recording medium; seventh means for determining logical addresses of heads of portions of the recording medium which are loaded with portions of the encryption-resultant information corresponding to the respective information pieces; eighth means for determining a correspondence relation between the logical addresses determined by the seventh means and the assigned serial numbers, and generating second information representing the determined correspondence relation; and ninth means for recording the second information on the recording medium.

A second aspect of this invention is based on the first aspect thereof, and provides an information recording apparatus wherein the third means comprises means for generating the secret function from the base number and each of the assigned serial numbers.

A third aspect of this invention is based on the first aspect thereof, and provides an information recording apparatus wherein the third means comprises means for generating the secret function from the base number and each of the logical addresses determined by the seventh means.

A fourth aspect of this invention is based on the first aspect thereof, and provides an information recording apparatus wherein the predetermined minimum information unit corresponds to a combination of a 4-byte source packet header and a 188-byte MPEG2 transport packet.

A fifth aspect of this invention is based on the first aspect thereof, and provides an information recording apparatus wherein the predetermined minimum information unit corresponds to 184 latter bytes in a 188-byte MPEG2 transport packet in a combination of a 4-byte source packet header and the 188-byte MPEG2 transport packet.

A sixth aspect of this invention is based on the first aspect thereof, and provides an information recording apparatus wherein the predetermined minimum information unit corresponds to a bit number equal to bit numbers of logical sectors defined on the recording medium.

A seventh aspect of this invention is based on the first aspect thereof, and provides an information recording apparatus wherein the fifth means comprises means for dividing each of the information pieces into blocks each composed of a first portion and a second portion, means for encrypting the first portions of the blocks in response to the encryption key, means for non-encrypting the second portions of the blocks, and means for setting one among bits composing the second portion of each of the blocks as an indication of whether or not the related first portion of the block is encrypted.

An eighth aspect of this invention is based on the first aspect thereof, and provides an information recording apparatus wherein the fifth means comprises means for dividing each of the information pieces into blocks, and means for encrypting first ones among the blocks in response to the encryption key and non-encrypting others of the blocks according to a prescribed rule.

A ninth aspect of this invention is based on the first aspect thereof, and provides an information recording apparatus wherein the third and fourth means comprise means for generating the encryption key while relating the encryption key and the information range to the assigned serial numbers.

A tenth aspect of this invention provides an information recording and reproducing apparatus comprising first means for dividing first information to be recorded into equal-size information pieces; second means for assigning serial numbers to the information pieces respectively which are generated by the first means; third means for generating a secret function from a base number and a variable number varying for each of the information pieces, the base number being common to an information range managed by one licence; fourth means for generating an encryption key according to the secret function generated by the third means, the encryption key being updated for each of the information pieces; fifth means for encrypting the first information on a block-by-block basis in response to the encryption key generated by the fourth means to get encryption-resultant information for every predetermined minimum information unit smaller than the sizes of the information pieces; sixth means for recording the encryption-resultant information generated by the fifth means on a recording medium; seventh means for determining logical addresses of heads of portions of the recording medium which are loaded with portions of the encryption-resultant information corresponding to the respective information pieces; eighth means for determining a correspondence relation between the logical addresses determined by the seventh means and the assigned serial numbers, and generating second information representing the determined correspondence relation; ninth means for recording the second information on the recording medium; tenth means for reproducing the encryption-resultant information from the recording medium; eleventh means for deriving the variable number from the encryption-resultant information reproduced by the tenth means; twelfth means for generating the secret function from the base number and the variable number derived by the eleventh means; thirteenth means for generating a decryption key according to the secret function generated by the twelfth means; and fourteenth means for decrypting the reproduced encryption-resultant information on a block-by-block basis in response to the decryption key generated by the thirteenth means to get decryption-resultant information for every predetermined minimum information unit.

An eleventh aspect of this invention is based on the tenth aspect thereof, and provides an information recording and reproducing apparatus wherein the third means comprises means for generating the secret function from the base number and each of the assigned serial numbers.

A twelfth aspect of this invention is based on the tenth aspect thereof, and provides an information recording and reproducing apparatus wherein the third means comprises means for generating the secret function from the base number and each of the logical addresses determined by the seventh means.

A thirteenth aspect of this invention is based on the tenth aspect thereof, and provides an information recording and reproducing apparatus wherein the predetermined minimum information unit corresponds to a combination of a 4-byte source packet header and a 188-byte MPEG2 transport packet.

A fourteenth aspect of this invention is based on the tenth aspect thereof, and provides an information recording and reproducing apparatus wherein the predetermined minimum information unit corresponds to 184 latter bytes in a 188-byte MPEG2 transport packet in a combination of a 4-byte source packet header and the 188-byte MPEG2 transport packet.

A fifteenth aspect of this invention is based on the tenth aspect thereof, and provides an information recording and reproducing apparatus wherein the predetermined minimum information unit corresponds to a bit number equal to bit numbers of logical sectors defined on the recording medium.

A sixteenth aspect of this invention is based on the tenth aspect thereof, and provides an information recording and reproducing apparatus wherein the fifth means comprises means for dividing each of the information pieces into blocks each composed of a first portion and a second portion, means for encrypting the first portions of the blocks in response to the encryption key, means for non-encrypting the second portions of the blocks, and means for setting one among bits composing the second portion of each of the blocks as an indication of whether or not the related first portion of the block is encrypted.

A seventeenth aspect of this invention is based on the tenth aspect thereof, and provides an information recording and reproducing apparatus wherein the fifth means comprises means for dividing each of the information pieces into blocks, and means for encrypting ones among the blocks in response to the encryption key and non-encrypting others of the blocks according to a prescribed rule.

An eighteenth aspect of this invention is based on the tenth aspect thereof, and provides an information recording and reproducing apparatus wherein the third and fourth means comprise means for generating the encryption key while relating the encryption key and the information range to the assigned serial numbers, and wherein the twelfth and thirteenth means comprise means for generating the decryption key while relating the decryption key and the information range to the assigned serial numbers.

A nineteenth aspect of this invention provides a method of recording information. The method comprises the steps of dividing first information into equal-size information pieces; assigning serial numbers to the information pieces respectively; generating an encryption key from a base number and a variable number varying for each of the information pieces, the base number being common to an information range managed by one licence; encrypting the first information on a block-by-block basis in response to the encryption key to get encryption-resultant information for every predetermined minimum information unit smaller than the sizes of the information pieces; recording the encryption-resultant information on a recording medium; determining logical addresses of heads of portions of the recording medium which are loaded with portions of the encryption-resultant information corresponding to the respective information pieces; determining a correspondence relation between the determined logical addresses and the assigned serial numbers, and generating second information representing the determined correspondence relation; and recording the second information on the recording medium.

A twentieth aspect of this invention provides a method of recording and reproducing information. The method comprises the steps of dividing first information into equal-size information pieces; assigning serial numbers to the information pieces respectively; generating an encryption key from a base number and a variable number varying for each of the information pieces, the base number being common to an information range managed by one licence; encrypting the first information on a block-by-block basis in response to the encryption key to get encryption-resultant information for every predetermined minimum information unit smaller than the sizes of the information pieces; recording the encryption-resultant information on a recording medium; determining logical addresses of heads of portions of the recording medium which are loaded with portions of the encryption-resultant information corresponding to the respective information pieces; determining a correspondence relation between the determined logical addresses and the assigned serial numbers, and generating second information representing the determined correspondence relation; recording the second information on the recording medium; reproducing the encryption-resultant information from the recording medium; deriving the variable number from the reproduced encryption-resultant information; generating a decryption key from the base number and the derived variable number; and decrypting the reproduced encryption-resultant information on a block-by-block basis in response to the decryption key to get decryption-resultant information for every predetermined minimum information unit.

A twenty-first aspect of this invention provides a recording medium used by the information recording apparatus in the first aspect of this invention.

A twenty-second aspect of this invention provides a recording medium used by the information recording and reproducing apparatus in the tenth aspect of this invention.

DETAILED DESCRIPTION OF THE INVENTION

First Embodiment

Figure 1:
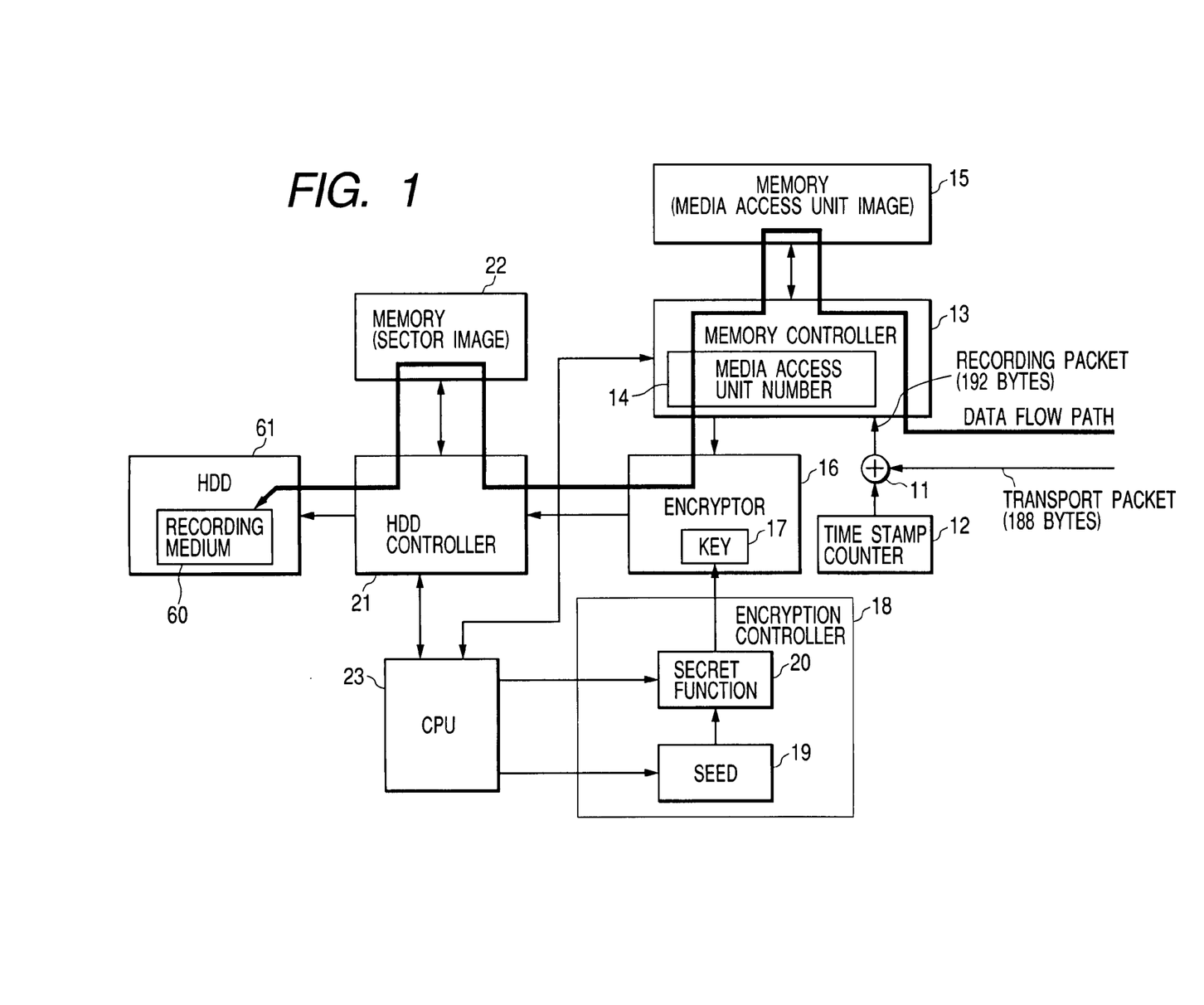
FIG. 1 is a block diagram of an information recording apparatus according to a first embodiment of this invention.

FIG. 1 shows an information recording apparatus according to a first embodiment of this invention. The apparatus of FIG. 1 encrypts input audio-visual data into encryption-resultant audio-visual data, and records the encryption-resultant audio-visual data on a recording medium 60 within a hard disk drive (HDD) 61.

Preferably, data to be recorded on the hard disk (the recording medium) 60 are divided into successive equal-size blocks. The data blocks are recorded on successive areas in the hard disk 60 which have serial logical block addresses (LBA's), respectively. This procedure shortens seek times, thereby providing a higher effective bit rate in the data recording on the hard disk 60. The data blocks have a size of, for example, about 1 MB or 2 MB.

Received data obtained by a BS digital broadcast receiver or a CS digital broadcast receiver have a form as a transport stream of the MPEG2 standards, that is, a stream of 188-byte transport packets of the MPEG2 standards. Here, MPEG2 is short for "Moving Picture Experts Group 2". According to a basic recording procedure from which encryption is excluded, time stamps are added to the transport stream, and the time-stamp-added transport stream is recorded on the hard disk 60.

The apparatus of FIG. 1 includes an adder 11 fed with a stream of 188-byte transport packets of the MPEG2 standards from a BS digital broadcast receiver or a CS digital broadcast receiver. Preferably, every 188-byte transport packet corresponds to a minimum division unit. Generally, 188-byte transport packets are loaded with audio-visual data representing a broadcasted content or contents. A time stamp counter 12 generates a 4-byte signal representative of a time stamp in synchronism with a system clock signal related to 188-byte transport packets. Thus, the time stamp is updated for every 188-byte transport packet. The time stamp counter 12 outputs the 4-byte time stamp signal to the adder 11. The device 11 adds and combines the 4-byte time stamp signal and every 188-byte transport packet into a 192-byte recording packet. The 4-byte time stamp signal indicates the time of the arrival of the related 188-byte transport packet. The adder 11 feeds a stream of 192-byte recording packets to a memory controller 13. The memory controller 13 stores every 192-byte recording packet into a memory 15.

Figure 2:
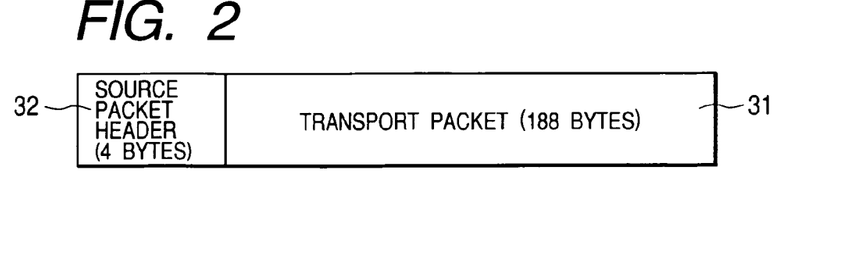
FIG. 2 is a diagram of the structure of a recording packet.

As shown in FIG. 2, one 192-byte recording packet is composed of a 188-byte transport packet 31 and a 4-byte source packet header 32. The 188-byte transport packet 31 is preceded by the 4-byte source packet header 32. The 4-byte source packet header 32 is occupied by a 4-byte time stamp signal indicating the time of the arrival of the related 188-byte transport packet 31.

Figure 3:
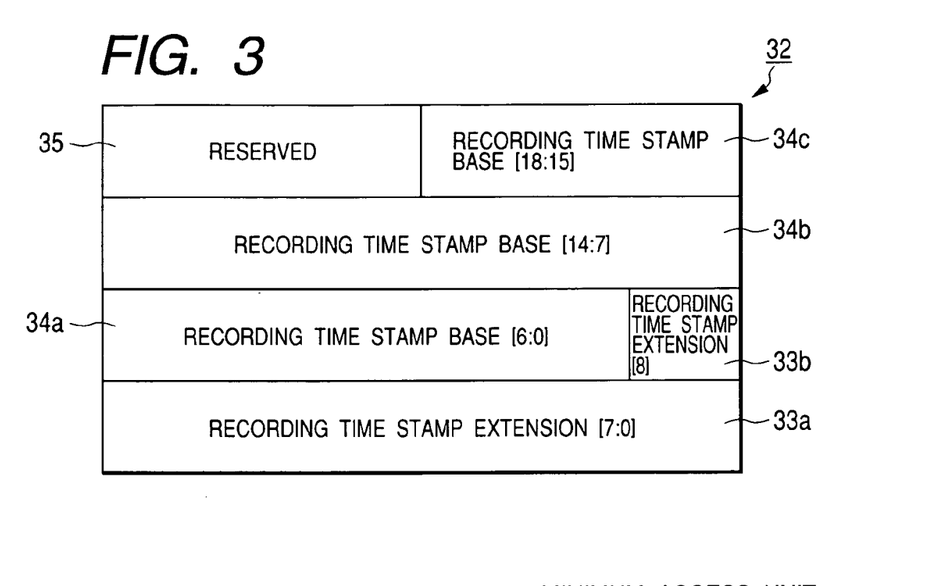
FIG. 3 is a diagram of the structure of a source packet header in FIG. 2.

As shown in FIG. 3, one 4-byte source packet header 32 is divided into segments 33a, 33b, 34a, 34b, 34c, and 35 arranged in that order as viewed from the lowest bit toward the highest bit. The segments 33a and 33b have 9 successive bits representing a recording time stamp extension which takes an integer variable from "0" to "299" in unit of the period of a 27-MHz system clock signal. The segments 34a, 34b, and 34c have 19 successive bits representing a recording time stamp base incremented by "1" when the recording time stamp extension changes from "299" to "0". The segment 35 has 4 reserved bits.

The MSB of the recording time stamp extension is placed at the 24th higher bit (33b) in the source packet header 32. The LSB of the recording time stamp extension is placed at the lowest bit or the 1st lower bit in the source packet header 32. The 4 higher bits in the recording time stamp base are placed in the segment 34c which has the 5th higher bit to the 8th higher bit. The remaining bits in the recording time stamp base are placed in the segments 34b and 34a.

Figure 4:
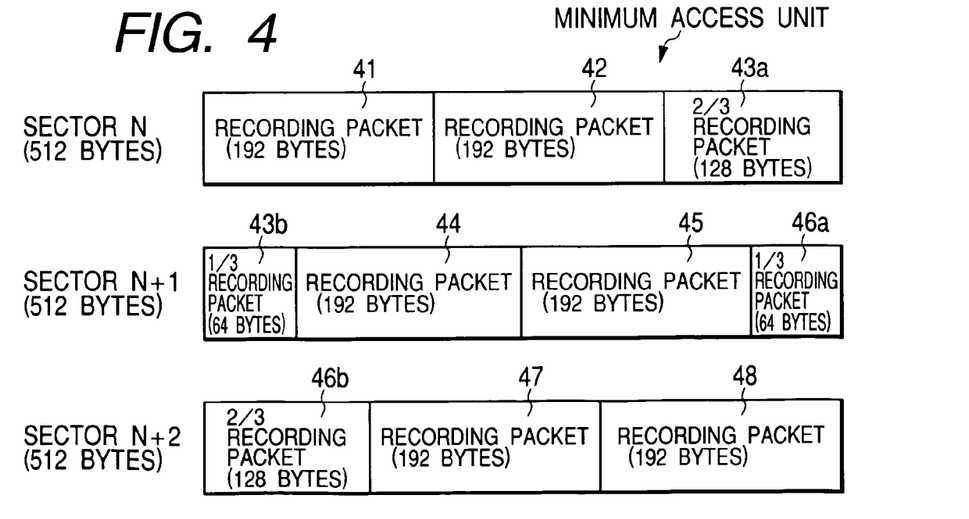
FIG. 4 is a diagram of the structure of a minimum access unit.

The recording area of the recording medium (the hard disk) 60 is divided into 512-byte sectors. Recording packets are mapped onto recording-medium sectors as follows. The 512-byte sectors of the recording medium 60 are separated into unit sector groups. With reference to FIG. 4, three successive sectors N, N+1, and N+2 compose a unit sector group defined as a minimum access unit. In every unit sector group (every minimum access unit), a first sector N is assigned to two 192-byte recording packets 41 and 42 and two-thirds of a next 192-byte recording packet which are denoted by "43a". The two-thirds of the 192-byte recording packet have a size of 128 bytes. A second sector N+1 is assigned to the remaining one-third of the 192-byte recording packet which is denoted by "43b", two subsequent 192-byte recording packets 44 and 45, and one-third of a next 192-byte recording packet which is denoted by "46a". The one-third of each 192-byte recording packet has a size of 64 bytes. A third sector N+2 is assigned to the remaining two-thirds of the 192-byte recording packet which are denoted by "46b", and two subsequent 192-byte recording packets 47 and 48. The two-thirds of the 192-byte recording packet have a size of 128 bytes. Accordingly, one unit sector group (one minimum access unit) is assigned to eight successive 192-byte recording packets.

The memory controller 13 stores successive 192-byte recording packets into the memory 15 in a manner such that three successive hard-disk sectors can be loaded with eight successive 192-byte recording packets. A group of such three successive hard-disk sectors (FIG. 4) constitutes a minimum access unit.

Figure 5:
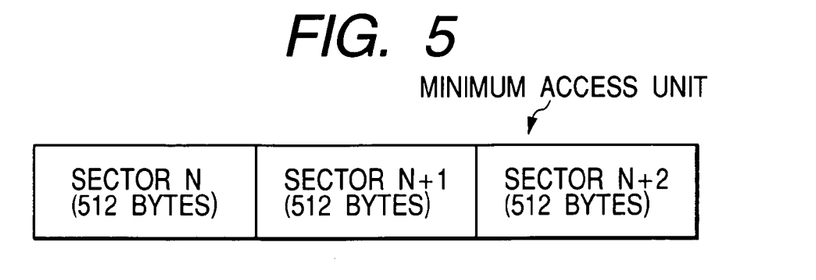
FIG. 5 is a diagram of the structure of a minimum access unit for a hard disk.

As shown in FIG. 5, one minimum access unit has three successive hard-disk sectors N, N+1, and N+2. Since each of the hard-disk sectors N, N+1, and N+2 has 512 bytes, the minimum access unit is equal to 1,536 bytes in size.

Figure 6:
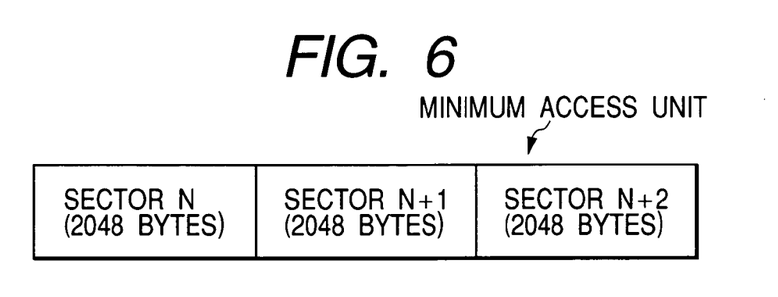
FIG. 6 is a diagram of the structure of a minimum access unit for an optical disk.

The hard disk drive 61 may be replaced by an optical disk drive. A recording medium (an optical disk) in the optical disk drive has a recording area divided into 2048-byte sectors. In this case, as shown in FIG. 6, one minimum access unit has three successive optical-disk sectors N, N+1, and N+2. Since each of the optical-disk sectors N, N+1, and N+2 has 2,048 bytes, the minimum access unit is equal to 6,144 bytes in size.

It should be noted that both the hard disk drive 61 and the optical disk drive may be provided in the apparatus of FIG. 1.

Figure 7:
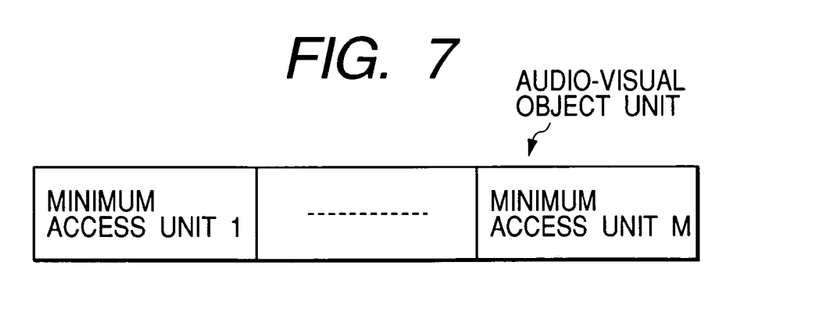
FIG. 7 is a diagram of the structure of an audio-visual object unit.

Minimum access units are separated into groups corresponding to audio-visual object units respectively. As shown in FIG. 7, one audio-visual object unit is composed of successive minimum access units numbered as "1", "2", . . . , and "M" respectively. One audio-visual object unit corresponds to one GOP (group of pictures) being a unit for compressed picture data of the MPEG standards. A typical MPEG system implements decoding on a GOP-by-GOP basis. Specifically, the typical MPEG system starts decoding at the head of every GOP.

Figure 8:
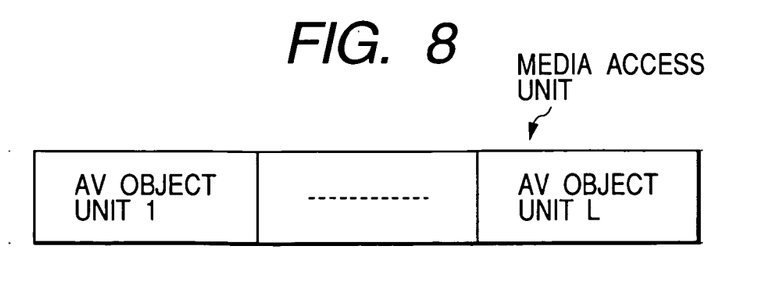
FIG. 8 is a diagram of the structure of a media access unit.

With reference to FIG. 8, a media access unit is defined which normally contains a plurality of successive audio-visual object units numbered as "1", "2", . . . , and "L" respectively. Data recording on the hard disk 60 is implemented by a unit-by-unit basis with respect to media access units. One media access unit has a size of, for example, about 1.5 MB. Such relatively large media access units are effective in suppressing the occurrence of fragmentation on the recording medium 60, and in providing a practical transmission bit rate. The boundaries between media access units may be separate from the boundaries between audio-visual object units. In other words, each of the head and tail of one media access unit may be non-coincident with the boundary between audio-visual object units.

With reference back to FIG. 1, the memory controller 13 reads out a group of successive recording packets from the memory 15 for every media access unit. The memory controller 13 assigns a media access unit number (a media access unit ID number) 14 to the group of successive recording packets. The media access unit number 14 is serial, and is updated for every media access unit. As will be made clear later, the media access unit number 14 is notified by a CPU 23. The memory controller 13 adds a signal representative of the media access unit number 14 to the group of successive recording packets. The memory controller 13 feeds the ID-number-added group of successive recording packets to an encryptor 16 as content data corresponding to the media access unit. The added signal of the media access unit number 14 may remain non-encrypted.

A CPU 23 includes an input/output port, a processing section, and memories. The CPU 23 operates in accordance with a control program stored in one of the memories therein. The control program is designed to enable the CPU 23 to implement operation steps indicated later.

The CPU 23 holds a signal representative of a seed 19 being a common base number for generating changeable key data, that is, a common base for generating different encryption keys. The seed 19 is common to content data managed by one licence. The CPU 23 writes the signal of the seed 19 into a memory within an encryption controller 18. The CPU 23 generates the signal of the media access unit number 14 which is updated for every media access unit. The CPU 23 feeds the signal of the media access unit number 14 to the memory controller 13 and the encryption controller 18.

The encryption controller 18 generates a secret function 20 from the seed 19 and the media access unit number 14. The encryption controller 18 calculates an encryption key 17 according to the generated secret function 20. Thus, the encryption controller 18 calculates the encryption key 17 from the seed 19 and the media access unit number 14. Since the media access unit number 14 changes for every media access unit, the encryption key 17 is updated for every media access unit. The calculation of the encryption key 17 and the updating thereof are relatively easy. The encryption controller 18 feeds a signal representative of the encryption key 17 to the encryptor 16.

Preferably, the signal of the encryption key 17 has a size in the range of about 56 bits to about 128 bits. Most preferably, the size of the signal of the encryption key 17 is equal to 56 bits, 64 bits, or 128 bits.

The encryptor 16 receives, from the memory controller 13, content data corresponding to every media access unit and additionally having the signal of the media access unit number (the media access unit ID number) 14. The device 16 encrypts the received content data into encryption-resultant content data in response to the encryption key 17 on a block-by-block basis in which "block" corresponds to one recording packet. The encryptor 16 feeds the encryption-resultant content data to an HDD controller 21.

The HDD controller 21 stores the encryption-resultant content data into a memory 22. The HDD controller 21 reads out the encryption-resultant content data from the memory 22 for every hard-disk sector, and feeds the read-out encryption-resultant content data to the hard disk drive 61. The device 21 controls the hard disk drive 61, thereby recording the encryption-resultant content data on the recording medium (the hard disk) 60 on a sector-by-sector basis.

Serial logical addresses starting from "0" are assigned to the sectors of the hard disk 60, respectively. The logical addresses are used for identifying the sectors. A block of the encryption-resultant content data which corresponds to every media access unit is recorded on a set of successive sectors of the hard disk 60. The HDD controller 21 informs the CPU 23 of the logical addresses of the sectors in the sector set. For every media access unit, the CPU 23 recognizes the related media access unit number 14 and the logical address of the first sector in the related sector set, and loads an internal memory with an information piece representing a pair of the recognized media access unit number 14 and the recognized logical address of the first sector in the related sector set. After the data recording on the hard disk 60 has been completed, information pieces accumulated in the memory within the CPU 23 indicate a table listing pairs of the media access unit numbers 14 and the logical addresses of the first sectors in the sector sets which correspond to the media access units respectively. The table represents a correspondence relation between the media access unit numbers 14 and the logical addresses of the first sectors in the sector sets.

The CPU 23 transfers information representative of the table from the internal memory to the HDD controller 21. The CPU 23 controls the hard disk drive 61 via the HDD controller 21, thereby recording the information of the table on the hard disk 60 as a file separate from a file of the content data. The information of the table can be used as auxiliary information for high-speed playback.

The CPU 23 encrypts the signal of the seed 19 according to, for example, a public-key cryptosystem. The CPU 23 transfers the encryption-resultant signal of the seed 19 to the HDD controller 21. The CPU 23 controls the hard disk drive 61 via the HDD controller 21, thereby recording the encryption-resultant signal of the seed 19 on the hard disk 60 separately from the content data.

The secret function 20 in the encryption controller 18 may use the result of operating the seed 19 and the media access unit number 14 according to a one-way function such as SHA-1. Here, SHA is short for "Secure Hash Algorithm". Alternatively, the secret function 20 may use the result of DES operation which handles the media access unit number 14 and the seed 19 as an input vector and an encryption key respectively in a DES-based block encoding procedure.

Regarding the secret function 20, the media access unit number 14 and the seed 19 may be directly used as they are. Alternatively, one or a combination of ones may be used which are selected among (1) the results of the multiplication of the media access unit number 14 and the seed 19 by constant values, (2) specified bits extracted from the signals representing the media access unit number 14 and the seed 19, (3) the results of bit-shift operation of the signals representing the media access unit number 14 and the seed 19, (4) the result of OR operation between the signals representing the media access unit number 14 and the seed 19, and (5) the result of AND operation between the signals representing the media access unit number 14 and the seed 19.

As previously mentioned, the encryption key 17 is updated for every media access unit. In the audio-visual information range (the audio-visual data range) managed by one licence and having a plurality of media access units, the encryption keys 17 for the respective media access units originate from the common base number (the seed 19) for generating changeable key data. The secret function 20 has a portion containing the signal representative of the media access unit number 14 updated for every media access unit. The encryption keys 17 for the respective media access units are generated from the common base number (the seed 19) and the secret function 20.

The encryption of the content data by the encryptor 16 may use a CBC mode of DES. Here, CBC is short for "Cipher Block Chaining". The CBC mode of DES causes the encryption to be recursive. The CBD-mode encryption is advantageous since it is relatively difficult to infer the original content from the encryption result. According to DES, operation or calculation is implemented 64 bits by 64 bits. Therefore, the unit for the initialization of the CBC mode corresponds to a multiple of 8 bytes.

Generally, the encryption of the content data by the encryptor 16 is implemented on a block-by-block basis. One block may correspond to a bit number equal to bit numbers of logical sectors defined on the recording medium 60.

As previously mentioned, the encryption of the content data by the encryptor 16 is implemented recording-packet by recording-packet. One recording packet has a size of 192 bytes (see FIG. 2). Every recording packet may be divided into a former portion and a latter portion. The former portion consists of a 4-byte source packet header and 4 front bytes of a 188-byte transport packet (see FIG. 2). The latter portion consists of the 184 remaining bytes of the 188-byte transport packet. The latter portion may be encrypted while the former portion remains non-encrypted. In this case, the encryption of the content data by the encryptor 16 is implemented 184 bytes by 184 bytes. Alternatively, the encryption of the content data by the encryptor 16 may be implemented on a block-by-block basis in which "block" corresponds to one hard-disk sector having a size of 512 bytes. The encryption of the content data by the encryptor 16 may be implemented on a block-by-block basis in which "block" corresponds to one optical-disk sector having a size of 2,048 bytes.

In the case where the initialization of the CBC mode is executed in unit of 192 bytes or 184 bytes, the initialization unit (the encryption unit) agrees with a minimum unit of encoding audio-visual data. Therefore, in the event that an error occurs, the propagation of the error can be effectively suppressed. In the case where the initialization of the CBC mode is executed in unit of 512 bytes, the initialization unit (the encryption unit) agrees with a minimum unit of reading out information from the hard disk 60. In this case, since the encryption unit is relatively great, it is more difficult to infer the original content from the encryption result. In the case where the initialization of the CBC mode is executed in unit of 2,048 bytes, the initialization unit (the encryption unit) agrees with a minimum unit of reading out information from the optical disk. In this case, since the encryption unit is relatively great, it is more difficult to infer the original content from the encryption result.

In the case where the initialization of the CBC mode is executed in unit of 184 bytes, every 192-byte recording packet is divided into a former 8-byte portion and a latter 184-byte portion which are non-encrypted and encrypted respectively. The former 8-byte portion consists of a 4-byte source packet header and 4 front bytes of a 188-byte transport packet. The latter 184-byte portion consists of the 184 remaining bytes of the 188-byte transport packet.

The latter 184-byte portions of respective recording packets may be selectively encrypted or non-encrypted. In this case, the encryptor 16 sets a specified one bit in the former 8-byte portion of every recording packet as a flag representing whether the latter 184-byte portion of the recording packet is encrypted or non-encrypted. A first audio-visual program to be encrypted and a second audio-visual program to be non-encrypted can be represented by a sequence of recording packets on a multiplexed basis. In this case, the encryptor 16 separates recording packets into a first group assigned to the first audio-visual program to be encrypted and a second group assigned to the second audio-visual program to be non-encrypted. The flag in each first-group recording packet is in a state representing that the latter 184-byte portion of the recording packet is encrypted. On the other hand, the flag in each second-group recording packet is in a state representing that the latter 184-byte portion of the recording packet is non-encrypted.

For example, specified one bit among the 4 reserved bits in the front segment 35 (see FIG. 3) of the source packet header in every recording packet is used as the previously-mentioned flag. Alternatively, specified one bit among 2 bits representative of MPEG encrypting conditions in the 4 front bytes of the transport packet in every recording packet may be used as the previously-mentioned flag. In this case, the 2 bits being "00" represent that the latter 184-byte portion of the recording packet is non-encrypted while the 2 bits differing from "00" represent that the latter 184-byte portion of the recording packet is encrypted.

As previously mentioned, the CPU 23 notifies the media access unit number 14 to the encryption controller 18 regarding the secret function 20. Alternatively, the CPU 23 may generate a media-access-unit dependent number on the basis of the logical address of the first sector in the recording-medium sector set corresponding to each media access unit. In this case, the CPU 23 notifies the media-access-unit dependent number to the encryption controller 18, and the encryption controller 18 uses the media-access-unit dependent number for the generation of the secret function 20.

The CPU 23 may generate a media-access-unit dependent number on the basis of the relative pointer for accessing the recording medium 60 which corresponds to each media access unit. In this case, the CPU 23 notifies the media-access-unit dependent number to the encryption controller 18, and the encryption controller 18 uses the media-access-unit dependent number for the generation of the secret function 20.

Second Embodiment

Figure 9:
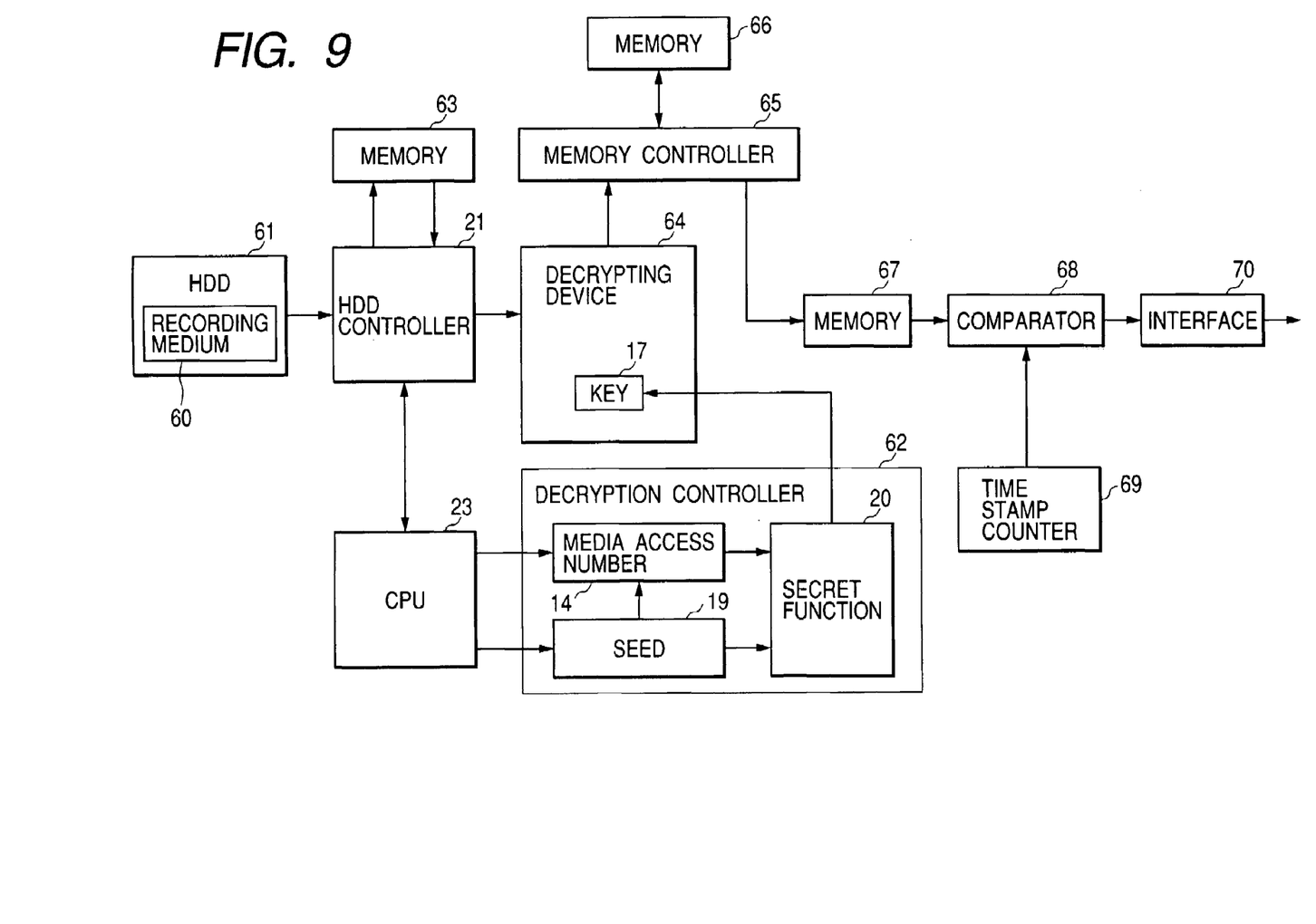
FIG. 9 is a block diagram of an information reproducing apparatus according to a second embodiment of this invention.

FIG. 9 shows an information reproducing apparatus according to a second embodiment of this invention. The information recording apparatus of FIG. 1 and the information reproducing apparatus of FIG. 9 may be combined into an information recording and reproducing apparatus.

The apparatus of FIG. 9 includes an HDD controller 21, a CPU 23, and a hard disk drive 61 which are also used in the apparatus of FIG. 1. The CPU 23 operates in accordance with a control program. The control program is designed to enable the CPU 23 to implement operation steps indicated later.

When the apparatus of FIG. 9 is turned on under the condition that the hard disk drive 61 contains a recording medium (a hard disk) 60, the apparatus operates as follows. The CPU 23 controls the hard disk drive 61 via the HDD controller 21 to read out an encryption-resultant signal of a seed 19 from the recording medium 60. The CPU 23 receives the encryption-resultant signal of the seed 19. The CPU 23 decrypts the encryption-resultant signal of the seed 19 into the original signal thereof according to, for example, a public-key cryptosystem. The CPU 23 feeds the original signal of the seed 19 to a decryption controller 62.

In addition, the CPU 23 controls the hard disk drive 61 via the HDD controller 21 to read out auxiliary information for high-speed playback from the recording medium 60. The CPU 23 receives the auxiliary information. The CPU 23 stores the auxiliary information in its internal memory. The auxiliary information represents a table listing pairs of media access unit numbers 14 and the logical addresses of first sectors in sector sets which correspond to media access units respectively.

The apparatus of FIG. 9 can be operated in one selected among different modes including a normal-speed playback mode and a high-speed playback mode.

During the normal-speed playback mode of operation, the CPU 23 controls the hard disk drive 61 via the HDD controller 21 to read out encryption-resultant content data from the recording medium 60 on a sector-by-sector basis. The read-out encryption-resultant content data are transferred from the hard disk drive 61 to a memory 63 via the HDD controller 21 before being stored into the memory 63. The encryption-resultant content data accumulated in the memory 63 periodically correspond to a media access unit. The memory 63 may use the memory 22 in the apparatus of FIG. 1. The CPU 23 extracts a signal representative of a media access unit number 14 from the read-out encryption-resultant content data. Alternatively, on the basis of historical conditions of the read-out of the encryption-resultant content data from the recording medium 60, the CPU 23 may calculate a media access unit number 14 related to the read-out encryption-resultant content data. Thus, the CPU 23 generates a signal representative of the media access unit number 14. The CPU 23 feeds the signal of the media access unit number 14 to the decryption controller 62.

The decryption controller 62 generates a secret function 20 from the seed 19 and the media access unit number 14. The secret function 20 is the same as that used in the apparatus of FIG. 1. The decryption controller 62 calculates a decryption key 17 according to the generated secret function 20. Thus, the decryption controller 62 calculates the decryption key 17 from the seed 19 and the media access unit number 14. The decryption key 17 is the same as the encryption key 17 used in the apparatus of FIG. 1. The decryption controller 62 feeds a signal representative of the decryption key 17 to a decrypting device 64.

Encryption-resultant content data corresponding to every media access unit are transferred from the memory 63 to the decrypting device 64 via the HDD controller 21. The decrypting device 64 decrypts the encryption-resultant content data into decryption-resultant content data in response to the decryption key 17 on a block-by-block basis in which "block" corresponds to one recording packet. The decrypting device 64 feeds the decryption-resultant content data, that is, plural reproduced recording packets, to a memory controller 65.

The memory controller 65 stores the decryption-resultant content data (the reproduced recording packets) into a memory 66. The memory controller 65 and the memory 66 may use the memory controller 13 and the memory 15 in the apparatus of FIG. 1, respectively. The memory controller 65 transfers reproduced recording packets from the memory 66 to a memory 67 one by one.

A time stamp counter 69 generates a signal representative of a time stamp in synchronism with a system clock signal related to 188-byte transport packets. Thus, the time stamp is updated for every 188-byte transport packet. The time stamp counter 69 outputs the time stamp signal to a comparator 68.

The comparator 68 has a memory accessing section and a comparing section for implementing the following operation steps. The comparator 68 reads out the time stamp signal from the source packet header of a reproduced recording packet in the memory 67. The device 68 compares the read-out time stamp signal with the time stamp signal from the time stamp counter 69. When the read-out time stamp signal becomes equal to the time stamp signal from the time stamp counter 69, the comparator 68 transfers the transport packet in the reproduced recording packet from the memory 67 to an interface 70 for connection with a BS digital broadcast receiver, a CS digital broadcast receiver, or an MPEG-decoder-added television display. After the transfer of the present transport packet from the memory 67, a next recording packet is transmitted from the memory 66 to the memory 67.

The CPU 23 is connected with an operation unit which can be accessed by a user. The CPU 23 can receive, from the operation unit, user's command to operate the apparatus of FIG. 9 in the high-speed playback mode. Upon the reception of the user's command, the CPU 23 functions to start the high-speed playback mode of operation of the apparatus. During the high-speed playback mode of operation, ones selected among media access units on the recording medium 60 are read out while the others are skipped.

Firstly, the CPU 23 responds to the user's command to execute the following operation step. Among media access units on the recording medium 60, the CPU 23 selects ones to be read out. The CPU 23 gets the logical addresses of the first sectors in the sector sets corresponding to the selected media access units. The CPU 23 informs the HDD controller 21 of the logical addresses of the first sectors in the sector sets corresponding to the selected media access units respectively, and controls the hard disk drive 61 via the HDD controller 21 to sequentially read out encryption-resultant content data from the the recording medium 60 which correspond to the selected media access units. The read-out encryption-resultant content data are transferred from the hard disk drive 61 to the memory 63 via the HDD controller 21. The encryption-resultant content data accumulated in the memory 63 periodically correspond to one of the selected media access units. The CPU 23 refers to the auxiliary information representing the table listing pairs of media access unit numbers 14 and the logical addresses of first sectors in sector sets which correspond to media access units respectively. Specifically, the CPU 23 accesses the table in response to the logical address of the first sector corresponding to the present selected media access unit, and thereby gets the media access unit number 14 corresponding to the current read-out encryption-resultant content data. Thus, the CPU 23 generates a signal representative of the media access unit number 14 corresponding to the current read-out encryption-resultant content data. The CPU 23 feeds the signal of the media access unit number 14 to the decryption controller 62. The use of the table makes it possible to quickly and easily get the desired media access unit number 14.

During the high-speed playback mode of operation, the decryption controller 62 generates a secret function 20 from the seed 19 and the media access unit number 14. The decryption controller 62 calculates a decryption key 17 according to the generated secret function 20. The decryption controller 62 feeds a signal representative of the decryption key 17 to the decrypting device 64. Encryption-resultant content data corresponding to every selected media access unit are transferred from the memory 63 to the decrypting device 64 via the HDD controller 21. The decrypting device 64 decrypts the encryption-resultant content data into decryption-resultant content data in response to the decryption key 17 on a block-by-block basis in which "block" corresponds to one recording packet. The decrypting device 64 feeds the decryption-resultant content data, that is, plural reproduced recording packets, to the memory controller 65. The memory controller 65 stores the decryption-resultant content data (the reproduced recording packets) into the memory 66. The memory controller 65 transfers the reproduced recording packets from the memory 66 to the memory 67 one by one. The transport packet in every reproduced recording packet is transmitted from the memory 67 to the interface 70 through the comparator 68.

Third Embodiment

A third embodiment of this invention relates to an information recording and reproducing apparatus which is basically similar to a combination of the information recording apparatus of FIG. 1 and the information reproducing apparatus of FIG. 9. The apparatus in the third embodiment of this invention is designed in view of the following circumstances.

In general, most of cases where data are required to be encrypted or decrypted at a high speed use encrypting/decrypting means for encrypting/decrypting data, and key encrypting/decrypting means for protecting a key to encrypt/decrypt the data. In these cases, means for encrypting/decrypting data at a high speed uses a block common-key cryptosystem (for example, DES) which can easily be made into a circuit, and a public-key cryptosystem such as an elliptic curve cryptosystem or RSA is used to surely protect a key for encryption/decryption. Usually, a public-key cryptosystem is high in strength but requires an excessively large amount of calculation to handle a great amount of data. Accordingly, a method corresponding to a combination of the good points of the two cryptosystem is adopted.

Regarding means for encrypting/decrypting contents, an encryption key generally has 56 bits, 64 bits, or at most about 128 bits to prevent a circuit scale from becoming great. Accordingly, there is a chance that the encryption key can be inferred. The encryption key is exposed to various menaces in addition to mathematical-calculation-based analysis. For example, it is thought that information about the encryption key is leaked by a person who has taken part in designing the encryption key.

A key for encrypting/decrypting contents is effective only to a limited portion of the contents. The key is not effective to the whole of the contents. In the case where the key sequentially changes, it is possible to discourage a person who tries to illegally decode or decrypt encryption-resultant data. A related conceivable method is to, for every media access unit which is previously defined, update a key for encrypting/decrypting contents.

During the reproduction of recorded data from an HDD at a high speed, the recorded data are reproduced skippingly in an order different from the original order in which they are recorded while auxiliary data for high-speed reproduction are used. At that time, calculation of a new decryption key for every media access unit causes a very great load on a processor. During the recording, encryption/decryption of a contents encryption/decryption key for every media access unit (for about 1.5 seconds at a recording data rate of about 8 Mbps since one media access unit corresponds to 1.5 MB, or about 0.5 second at a recording data rate of 24 Mbps) in a technique of a public-key cryptosystem causes a very great load on a processor.

There is a conceivable way designed as follows. Encryption of contents is changed for every unit as small as possible. The number of times of calculation in a public-key cryptosystem for encrypting/decrypting a contents encryption/decryption key is reduced. Therefore, the load on a processor is decreased. The previously-mentioned keys for encrypting/decrypting contents are sequentially calculated by use of a function decided in secret according to information about its seed. A timing of change of the keys is controlled by use of 1-bit information. As previously mentioned, during high-speed reproduction, to calculate a contents encryption key which should be used next, it is necessary to manage how may media access units are skipped (a contents encryption/decryption key is assumed to be updated for every media access unit). Therefore, practical use is difficult.

Advantages Provided by Embodiments

The first, second, and third embodiments of this invention provide advantages as follows.
(1) A key for encrypting information to be recorded is updated for every prescribed data amount. Thus, even when the key is discovered, it is possible to limit a damage to a level as small as possible. Accordingly, it is possible to discourage a hacker.
(2) Even in the case where an encryption unit is small and the number of encryption keys is large, a load on processing is reduced since a number being a base of the encryption keys is encrypted for every prescribed data amount by a public-key cryptosystem.
(3) In the case where a plurality of information pieces are recorded on a single recording medium while being multiplexed for every minimum unit, only an information piece desired to be encrypted can be selectively encrypted.
(4) In the case where a plurality of information pieces are recorded on a single recording medium while being multiplexed for every minimum unit (especially in the case where they are recorded while taking a structure like an MPEG2 transport stream), ID's indicating the types of the information pieces are contained in non-encrypted portions. In addition, sequences of encryption keys can be varied from ID to ID.
(5) When the processing for encrypting information is heavy, only a selected part of the information is encrypted. In this case, when an object is compressed image data or compressed audio data, it is made difficult to implement decoding at a normal quality or decoding of meaningful information.
(6) During high-speed reproduction such that portions of encrypted data are skippingly reproduced from a recording medium, a key for decryption can be quickly calculated by referring to a table of the relation between logical addresses and serial numbers in prescribed data mount unit which should be accessed next. Therefore, the high-speed reproduction can be smoothly implemented.
(7) In the case the values referred to by the procedure (6) use logical addresses occurring at the time of accessing a recording medium, it is possible to prevent not only the illegally copying onto the outside of the recording medium but also the illegally copying onto the inside of the recording medium (since a logical address is unique in the recording medium, it can not be decoded when being copied onto another place).
(8) In the case the values referred to by the procedure (6) use relative pointers occurring at the time of accessing a recording medium, they can be easily decoded regardless of which positions in the recording medium they are located at.

What is claimed is:

1. An information recording apparatus comprising:
first means for dividing first information to be recorded into equal-size information pieces;
second means for assigning serial numbers to the information pieces respectively which are generated by the first means;
third means for generating a secret function from a base number and a variable number varying for each of the information pieces, the base number being common to content data managed by one licence;
fourth means for generating an encryption key according to the secret function generated by the third means, the encryption key being updated for each of the information pieces;
fifth means for encrypting the first information on a block-by-block basis with the encryption key generated by the fourth means to get encryption-resultant information for every predetermined minimum information unit smaller than the sizes of the information pieces;
sixth means for recording the encryption-resultant information generated by the fifth means on a recording medium;
seventh means for determining logical addresses of heads of portions of the recording medium which are recorded with portions of the encryption-resultant information corresponding to the respective information pieces;
eighth means for determining a correspondence relation between the logical addresses determined by the seventh means and the assigned serial numbers, and generating second information representing the determined correspondence relation; and
ninth means for recording the second information on the recording medium.

2. An information recording apparatus as recited in claim 1, wherein the third means comprises means for generating the secret function from the base number and each of the assigned serial numbers.

3. An information recording apparatus as recited in claim 1, wherein the third means comprises means for generating the secret function from the base number and each of the logical addresses determined by the seventh means.

4. An information recording apparatus as recited in claim 1, wherein the predetermined minimum information unit corresponds to a combination of a 4-byte source packet header and a 188-byte MPEG2 transport packet.

5. An information recording apparatus as recited in claim 1, wherein the predetermined minimum information unit corresponds to 184 latter bytes in a 188-byte MPEG2 transport packet in a combination of a 4-byte source packet header and the 188-byte MPEG2 transport packet.

6. An information recording apparatus as recited in claim 1, wherein the predetermined minimum information unit corresponds to a bit number, wherein the bit number corresponds to bit numbers of logical sectors defined on the recording medium.

7. An information recording apparatus as recited in claim 1, wherein the fifth means comprises means for dividing each of the information pieces into blocks each composed of a first portion and a second portion, means for encrypting the first portions of the blocks with the encryption key, means for non-encrypting the second portions of the blocks, and means for setting one among bits composing the second portion of each of the blocks as an indication of whether or not the related first portion of the block is encrypted.

8. An information recording apparatus as recited in claim 1, wherein the fifth means comprises means for dividing each of the information pieces into blocks, and means for encrypting first ones among the blocks with the encryption key and non-encrypting others of the blocks according to a prescribed rule.

9. An information recording apparatus as recited in claim 1, wherein the third and fourth means comprise means for generating the encryption key while relating the encryption key and the content data to the assigned serial numbers.

10. An information recording and reproducing apparatus comprising:
    first means for dividing first information to be recorded into equal-size information pieces;
    second means for assigning serial numbers to the information pieces respectively which are generated by the first means;
    third means for generating a secret function from a base number and a variable number varying for each of the information pieces, the base number being common to content data managed by one licence;
    fourth means for generating an encryption key according to the secret function generated by the third means, the encryption key being updated for each of the information pieces;
    fifth means for encrypting the first information on a block-by-block basis with the encryption key generated by the fourth means to get encryption-resultant information for every predetermined minimum information unit smaller than the sizes of the information pieces;
    sixth means for recording the encryption-resultant information generated by the fifth means on a recording medium;
    seventh means for determining logical addresses of heads of portions of the recording medium which are recorded with portions of the encryption-resultant information corresponding to the respective information pieces;
    eighth means for determining a correspondence relation between the logical addresses determined by the seventh means and the assigned serial numbers, and generating second information representing the determined correspondence relation;
    ninth means for recording the second information on the recording medium;
    tenth means for reproducing the encryption-resultant information from the recording medium;
    eleventh means for deriving the variable number from the encryption-resultant information reproduced by the tenth means;
    twelfth means for generating the secret function from the base number and the variable number derived by the eleventh means;
    thirteenth means for generating a decryption key according to the secret function generated by the twelfth means; and
    fourteenth means for decrypting the reproduced encryption-resultant information on a block-by-block basis with the decryption key generated by the thirteenth means to get decryption-resultant information for every predetermined minimum information unit.

11. An information recording and reproducing apparatus as recited in claim 10, wherein the third means comprises means for generating the secret function from the base number and each of the assigned serial numbers.

12. An information recording and reproducing apparatus as recited in claim 10, wherein the third means comprises means for generating the secret function from the base number and each of the logical addresses determined by the seventh means.

13. An information recording and reproducing apparatus as recited in claim 10, wherein the predetermined minimum information unit corresponds to a combination of a 4-byte source packet header and a 188-byte MPEG2 transport packet.

14. An information recording and reproducing apparatus as recited in claim 10, wherein the predetermined minimum information unit corresponds to 184 latter bytes in a 188-byte MPEG2 transport packet in a combination of a 4-byte source packet header and the 188-byte MPEG2 transport packet.

15. An information recording and reproducing apparatus as recited in claim 10, wherein the predetermined minimum information unit corresponds to a bit number, wherein the bit number corresponds to bit numbers of logical sectors defined on the recording medium.

16. An information recording and reproducing apparatus as recited in claim 10, wherein the fifth means comprises means for dividing each of the information pieces into blocks each composed of a first portion and a second portion, means for encrypting the first portions of the blocks with the encryption key, means for non-encrypting the second portions of the blocks, and means for setting one among bits composing the second portion of each of the blocks as an indication of whether or not the related first portion of the block is encrypted.

17. An information recording and reproducing apparatus as recited in claim 10, wherein the fifth means comprises means for dividing each of the information pieces into blocks, and means for encrypting ones among the blocks with the encryption key and non-encrypting others of the blocks according to a prescribed rule.

18. An information recording and reproducing apparatus as recited in claim 10, wherein the third and fourth means comprise means for generating the encryption key while relating the encryption key and the content data to the assigned serial numbers, and wherein the twelfth and thirteenth means comprise means for generating the decryption key while relating the decryption key and the information range to the assigned serial numbers.

19. A method of recording information, comprising the steps of:

dividing first information into equal-size information pieces;

assigning serial numbers to the information pieces respectively;

generating an encryption key from a base number and a variable number varying for each of the information pieces, the base number being common to content data managed by one licence;

encrypting the first information on a block-by-block basis with the encryption key to get encryption-resultant information for every predetermined minimum information unit smaller than the sizes of the information pieces;

recording the encryption-resultant information on a recording medium;

determining logical addresses of heads of portions of the recording medium which are recorded with portions of the encryption-resultant information corresponding to the respective information pieces;

determining a correspondence relation between the determined logical addresses and the assigned serial numbers, and generating second information representing the determined correspondence relation; and recording the second information on the recording medium.

20. A method of recording and reproducing information, comprising the steps of:

dividing first information into equal-size information pieces;

assigning serial numbers to the information pieces respectively;

generating an encryption key from a base number and a variable number varying for each of the information pieces, the base number being common to content data managed by one licence;

encrypting the first information on a block-by-block basis with the encryption key to get encryption-resultant information for every predetermined minimum information unit smaller than the sizes of the information pieces;

recording the encryption-resultant information on a recording medium;

determining logical addresses of heads of portions of the recording medium which are recorded with portions of the encryption-resultant information corresponding to the respective information pieces;

determining a correspondence relation between the determined logical addresses and the assigned serial numbers, and generating second information representing the determined correspondence relation; recording the second information on the recording medium;

reproducing the encryption-resultant information from the recording medium;

deriving the variable number from the reproduced encryption-resultant information;

generating a decryption key from the base number and the derived variable number; and decrypting the reproduced encryption-resultant information on a block-by-block basis with the decryption key to get decryption-resultant information for every predetermined minimum information unit.

21. A recording medium used by the information recording apparatus of claim 1.

22. A recording medium used by the information recording and reproducing apparatus of claim 10.

* * * * *